(12) United States Patent
Bryant (10) Patent No.: US 9,833,671 B1
(45) Date of Patent: Dec. 5, 2017

(54) GOLF EQUIPMENT HOLDER FOR CART

(71) Applicant: Timothy Bryant, Palm Desert, CA (US)

(72) Inventor: Timothy Bryant, Palm Desert, CA (US)

( * ) Notice: Subject to any disclaimer, the term of this patent is extended or adjusted under 35 U.S.C. 154(b) by 0 days.

(21) Appl. No.: 15/132,118

(22) Filed: Apr. 18, 2016

Related U.S. Application Data (63) Continuation-in-part of application No. 29/482,216, filed on Feb. 14, 2014, now Pat. No. Des. 753,932, which is a continuation-in-part of application No. 13/085,556, filed on Apr. 13, 2011, now abandoned.

(51) Int. Cl.
| | |
|---|---|
| *B60R 9/00* | (2006.01) |
| *A63B 55/60* | (2015.01) |
| *A63B 55/00* | (2015.01) |
| *B60R 9/08* | (2006.01) |
| *B60R 9/06* | (2006.01) |

(52) U.S. Cl.
CPC ............ *A63B 55/60* (2015.10); *A63B 55/408* (2015.10); *B60R 9/06* (2013.01); *B60R 9/08* (2013.01)

(58) Field of Classification Search
CPC .............................. A63B 55/60; A63B 55/408
See application file for complete search history.

(56) References Cited

U.S. PATENT DOCUMENTS

| | | | |
|---|---|---|---|
| 2,761,691 A | 9/1956 | George | |
| 3,042,443 A | 7/1962 | Laher | |
| 3,142,853 A | 8/1964 | Hensley | |
| 4,194,547 A * | 3/1980 | Sidor | A63B 55/00 206/315.6 |
| D302,886 S | 8/1989 | Padilla | |
| 5,069,481 A * | 12/1991 | Strange | B62J 11/00 211/70.2 |
| 5,094,345 A | 3/1992 | Yonnetti | |
| 5,555,589 A | 9/1996 | Moultrie | |
| 5,573,122 A | 11/1996 | Williams | |
| 5,607,053 A * | 3/1997 | Sumiyoshi | A63B 55/00 206/315.2 |
| 5,624,028 A * | 4/1997 | Shin | A63B 55/00 206/315.3 |
| 5,671,842 A * | 9/1997 | Jaworski | A63B 55/00 206/315.3 |

(Continued)

OTHER PUBLICATIONS

NPL1: Office Action dated Dec. 6, 2012 for U.S. Appl. No. 13/085,556 by inventor Timothy Bryant.

(Continued)

*Primary Examiner* — Derek Battisti (57) ABSTRACT

In one embodiment of the invention, an apparatus comprises: a golf equipment holder comprising a top component and a bottom component; a plurality of tubes disposed between and coupled to the top component and bottom component, wherein at least one of the tubes is configured to removably hold a golf club; wherein the top component comprises a plurality of apertures, wherein each of the plurality of apertures is vertically aligned with a corresponding one of the plurality of tubes; a handle pivotally attached to the top component, wherein the handle comprises an attachment component for removable mounting to a golf cart; and a club slide-lock mechanism configured to securely lock the golf club in the one of the tubes.

15 Claims, 11 Drawing Sheets

(56) References Cited

U.S. PATENT DOCUMENTS

| | | | |
|---|---|---|---|
| 5,718,301 A | 2/1998 | Williams | |
| D394,291 S | 5/1998 | Beltran et al. | |
| 5,775,513 A * | 7/1998 | Anthony | A63B 55/20 206/315.3 |
| D396,924 S | 8/1998 | Cardenas | |
| 5,826,764 A * | 10/1998 | Beckham | B60R 9/08 206/315.1 |
| D401,730 S | 11/1998 | Liao | |
| 5,829,604 A | 11/1998 | Brophy | |
| D427,431 S | 7/2000 | Jensen | |
| 6,299,000 B1 | 10/2001 | Cabrera | |
| 6,394,287 B2 | 5/2002 | Cabrera | |
| 6,641,192 B2 | 11/2003 | Eschenfelder | |
| D519,703 S | 4/2006 | Wu | |
| 7,481,311 B1 * | 1/2009 | Old | A63B 55/00 206/315.3 |
| 7,597,224 B2 * | 10/2009 | Jacobs | A63B 55/10 211/70.2 |
| 8,210,348 B1 * | 7/2012 | Chapman | A47B 63/02 206/391 |
| D714,511 S | 9/2014 | Kuklik | |
| D753,932 S | 4/2016 | Bryant | |
| 2005/0000987 A1 * | 1/2005 | Heidenreich | A63B 55/00 224/274 |
| 2006/0091089 A1 | 5/2006 | Christiansen et al. | |
| 2008/0135591 A1 | 6/2008 | Cassoni | |
| 2008/0217194 A1 * | 9/2008 | Lewter | A63B 55/60 206/315.6 |
| 2010/0187252 A1 | 7/2010 | Smith | |
| 2012/0261447 A1 | 10/2012 | Bryant | |

OTHER PUBLICATIONS

NPL2: Office Action dated Aug. 14, 2013 for U.S. Appl. No. 13/085,556 by inventor Timothy Bryant.

NPL3: Office Action dated Feb. 13, 2015 for U.S. Appl. No. 29/482,216 by inventor Timothy Bryant.

NPL4: Office Action dated Jun. 17, 2015 for U.S. Appl. No. 29/482,216 by inventor Timothy Bryant.

* cited by examiner

FIG. 16 ALTERNATE CLUB SLIDE-LOCK DETAIL

FIG. 15 INTERNAL CLUB SLIDE-LOCK DETAIL

FIG. 17

FIG. 18 TUBING TOP VIEW

FIG. 19 CLUB SHAFT RETAINER

GOLF EQUIPMENT HOLDER FOR CART

CROSS REFERENCE TO RELATED APPLICATIONS

This application is a continuation-in-part of U.S. application Ser. No. 29/482,216 which is a continuation-in-part of U.S. application Ser. No. 13/085,556. U.S. application Ser. Nos. 29/482,216 and 13/085,556 are hereby fully incorporated herein by reference.

FIELD

Embodiments of the invention relate generally to golf equipment holders and relate more particularly to golf equipment holders for removable attachment to golf carts.

DESCRIPTION OF THE RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

Golf is a very popular game that is enjoyed by players of almost all ages. Golf is based on precision control, or attempted precision control, of a golf ball by a golf player using golf clubs to put the golf ball into a golf hole. Competing golf players make use of different clubs to hit golf balls from golf tees into golf holes along a golf course. The player with the lowest number of hits, called strokes, over the course of a hole, a game (usually 9 or 18 holes) or a match wins.

While different golf courses have different designs, which are features that add to the complexity of the game, golf is basically a rule driven game that requires all players to follow the rules of golf. An internationally standardized "Rules of Golf" controls almost every aspect of the game, from how to keep score to the number of clubs a player is allowed (13 clubs plus a putter). The controlling aspect of the rules of golf is fairness; no player is entitled to an unfair advantage over another player. The player comes as he is, plays the course as it is, and plays the ball as it lies. Based on those basic principles golfers almost always use "regulation" golf balls, tees, and clubs for fairness while attempting to obtain "fair" advantages over other players based on playing skills and experiences.

As noted above golf is played by almost all ages. In fact, golf is played by many individuals with health problems and/or physical infirmities. To make golf accessible to more players many courses and organizations allow golf carts to carry golfers and their golf equipment over the golf course.

Golf carts are motorized vehicles that are usually powered by propane, gas, or electricity. Operated like a car, a golf cart carries two to four players and their playing equipment. Typically a golf cart includes one or more attachments that retain a golf bag that carries the golf equipment to the cart for transportation over the golf course.

While generally successful, golf carts are somewhat less than ideal carriers of golfing equipment. First, golf equipment is usually stored in golf bags, which tend to locate golf clubs more or less randomly within the bag. This makes it less than ideal when selecting which club to use on any given stroke. Sometimes a golf club might be missing, and the use of a golf bag makes it more difficult to determine which, if any, club is missing. Furthermore, using golf bags makes it somewhat difficult to obtain golf tees and other supplies while golfing.

Therefore, a technique for carrying golfing equipment in a cart such that the golf equipment is readily accessible and visible would be beneficial. Even more beneficial would be a golf equipment holder that attaches to a golf cart and holds the golf equipment so that the golf equipment is readily accessible and visible.

The background description provided herein is for the purpose of generally presenting the context of the disclosure. Work of the presently named inventor(s), to the extent the work is described herein, as well as aspects of the description that may not otherwise qualify as prior art at the time of filing, are neither expressly nor impliedly admitted as prior art against the present disclosure.

SUMMARY

Embodiments of the invention provide a golf equipment holder for removable attachment to a golf cart.

In one embodiment of the invention, an apparatus comprises: a golf equipment holder comprising a top component and a bottom component; a plurality of tubes disposed between and coupled to the top component and bottom component, wherein at least one of the tubes is configured to removably hold a golf club; wherein the top component comprises a plurality of apertures, wherein each of the plurality of apertures is vertically aligned with a corresponding one of the plurality of tubes; a handle pivotally attached to the top component, wherein the handle comprises an attachment component for removable mounting to a golf cart; and a club slide-lock mechanism configured to securely lock the golf club in the one of the tubes.

Other embodiments of the invention are discussed below.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

Figure 1:
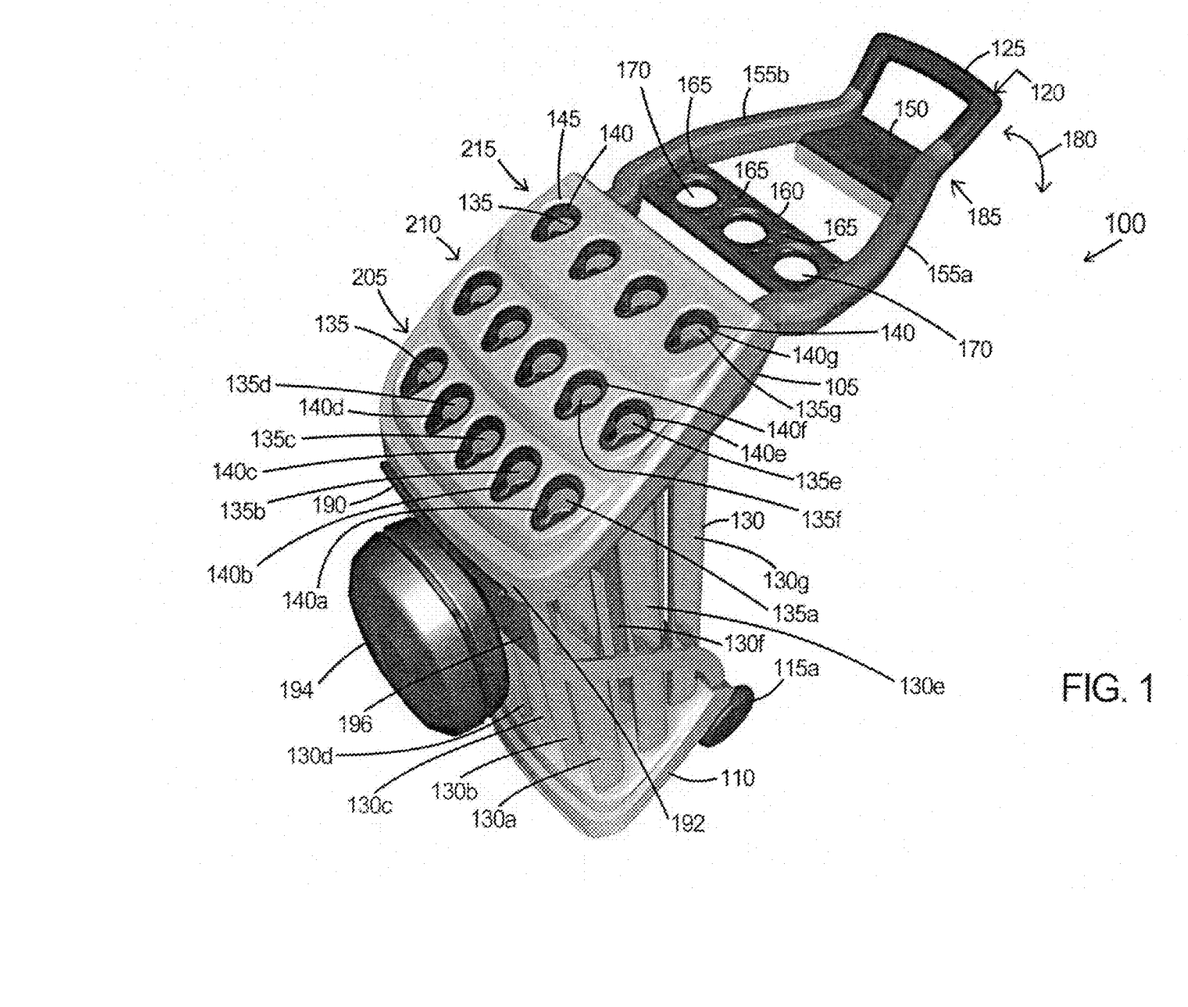
FIG. 1 is an illustration of a golf equipment holder in a side perspective view, in accordance with an embodiment of the invention.

FIG. 1 is an illustration of a golf equipment holder 100 in a side perspective view, in accordance with an embodiment of the invention. The golf equipment holder 100 can be removably attached to a golf cart, as will be shown in FIG. 6. The golf holder 100 removably holds golf equipment so that the golf equipment is readily accessible and visible to golf players. Two components are removably attached (or removably coupled or removably secured) means that two different components can be attached together or detached apart.

As shown the golf equipment holder 100 comprises a top component 105 and a bottom component 110, with wheels 115a and 115b that are attached to the bottom component 110 so that the user (e.g., golfer or caddy) can drag the golf equipment holder 100 by grabbing a handle 120 and pulling the golf equipment holder 100 so that the wheels 115a and 115b allow the golf equipment holder 100 to move or roll with ease over the ground. In another embodiment of the invention, the wheels 115a and 115b may be omitted.

The handle 120 includes a grip portion 125 that can be gripped by the user. The handle 120 is pivotally attached to the top component 105.

A plurality of tubes 130 are disposed between and coupled to the top component 105 and bottom component 110. The tubes 130 are used to removably hold and protect golf clubs, umbrellas, and/or ball retrievers when being transported. For cost, ease of assembly and fabrication, and/or low weight it beneficial that the down tubes 130 comprise a suitable material such as, for example, plastic, aluminum, or aluminum alloy.

In an embodiment of the invention, the top component 105 comprises a plurality of apertures 135 that are punched through the top component 105 so that a golf club can be removably inserted through the top component 105 via a given aperture 135. The apertures 135 are disposed along the length of the top component 105. For example, five (5) apertures 135 are disposed along a row 205 on the top component 105, five (5) apertures 135 are disposed along a row 210 on the top component 105, and four (4) apertures 135 are disposed along a row 215 on the top component 105. The number of apertures 135 along any of the rows 205, 210, and 215 may vary. The row 210 is between the row 205 and 215. The apertures 135 may, for example, have a pear-like shape. The number of rows can also vary such as less than three rows on the top component 105 or more than three rows on the top component 105.

In an embodiment of the invention, the elevation of row 205 is below the elevation of row 210 and the elevation of row 210 is below the elevation of row 215. In an embodiment of the invention, the top component 205 comprises rows in a stair-steps configuration wherein the rows comprises the apertures 135. However, the top component 205 can comprise other configurations or configuration shapes as well. If the top component 105 comprises a stair-steps configuration, the row 215 is on a top stair-step 220, the row 210 is on a middle stair-step 225, and the row 205 is on a bottom stair-step 230, wherein the elevation of stair-step 220 is above the elevation of stair-step 225 and the elevation of stair-step 225 is above the elevation of stair step 230. The different elevations of rows 220, 225, and 230 permit the user to see each of the golf clubs that are removably inserted in the apertures 135. The stair-steps 220, 225, and 230 are on a base 235 of the top component 105, and the tubes 130 are coupled to the base 235 of the top component 105. The stair-steps 220, 225, and 230 permits the user to see the head of each golf club 505 removably disposed within the apertures 135, without one golf club blocking the view of another golf club.

For ease of assembly, punching (or drilling) of the apertures 135 and low weight, it is typically beneficial that the top component 105 is made of aluminum, aluminum alloy, or hard plastic. The bottom component 110 can be made of the same material as the top component 105.

Each aperture 135 is vertically aligned with a corresponding tube 130 so that a given golf club can be removably inserted in a given aperture 135 and removably inserted in a given corresponding tube 130 that is vertically aligned with that given aperture 135. In other words, each of the plurality of apertures is vertically aligned with a corresponding one of the plurality of tubes. For example, the apertures 135a, 135b, 135c, and 135d (in row 205) are vertically aligned with the tubes 130a, 130b, 130c, and 130d, respectively. As an example, the apertures 135e and 135f (in row 210) are vertically aligned with the tubes 130e and 130f, respectively. As an example, the aperture 135g is vertically aligned with the tube 135g.

In an embodiment of the invention, the golf equipment holder 100 comprises a cargo pouch 194 that is removably coupled to a surface component 196 that is coupled to the top component 105 and/or bottom component 110.

A given bumper 140 is formed in and surrounds a given aperture 130. In particular, a given bumper 140 is attached to an inner wall 145 that surrounds and defines a given aperture 135. A given inner wall 135 is in the top component 105 and surrounds a given aperture 135. As an example, the bumpers 140a, 140b, 140c, 140d, 140e, 140f, and 140g surround the apertures 135a, 135b, 135c, 135d, 135e, 135f, and 135g, respectively. To aid in assembly and for best performance and to prevent scratching and marring of the shafts of the golf clubs as the golf cart is driven over the golf course, the bumpers 140 comprises polyurethane or rubber or other flexible material such as silicone or other material.

In an embodiment of the invention, the handle 120 comprises an attachment component 150 between and coupled to a first edge 155a and second edge 155b of the handle 120. The attachment component 150 is used to removably couple the golf equipment holder 100 to a golf cart, as will be discussed below. The handle may also optionally include a holder component 160 between and coupled to the first edge 155a and second edge 155b. The attachment component 150 is between the grip 125 and the holder component 160. The holder component 150 is between the attachment component 150 and the top component 105.

The holder component 160 comprises a plurality of small holes 165 which are configured to removably hold golf tees. As golf tees would tend to bounce out of the small holes if placed directly into the small holes 165, compression inserts are typically inserted into the small holes 165, as shown in commonly-owned U.S. patent application Ser. No. 13/085, 556. Golf tees are then inserted into the compression inserts. Typically, the compression inserts comprises either rubber or polyurethane.

The holder component 160 may also comprises a plurality of large holes 170 which are larger in circumference than the small holes 165. The large holes 170 are configured to removably hold golf balls.

Figure 2:
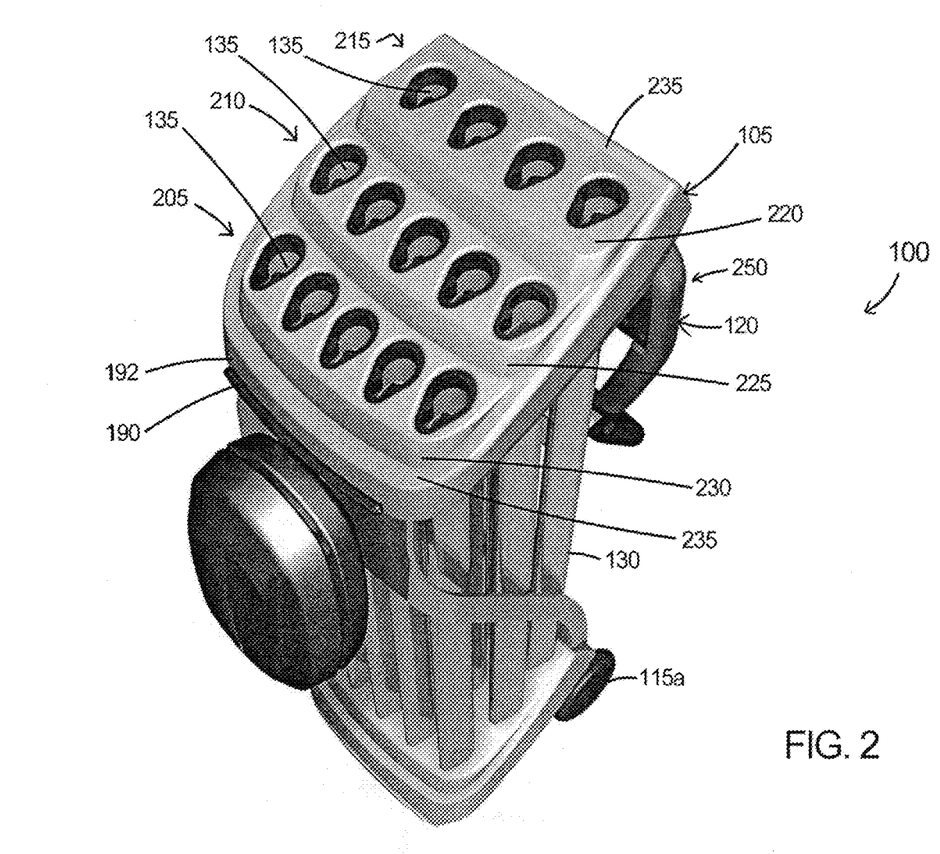
FIG. 2 is an illustration of a golf equipment holder in a side perspective view, wherein the handle of the golf equipment holder is folded, in accordance with an embodiment of the invention.

In an embodiment of the invention, the handle 180 can pivot or rotate as symbolically shown by the double-headed arrows 180 so that the handle 180 can be in an extended (or substantially horizontal) position 185 as shown in FIG. 1 or can be folded in a folded (or substantially vertical) position 250 as shown in FIG. 2.

In an embodiment of the invention, the golf equipment holder 100 comprises a lock activation handle 190 that is positioned on a side surface 192 of the top component 105. This lock activation handle 192 will be discussed further below.

FIG. 2 is an illustration of a golf equipment holder 100 in a side perspective view, wherein the handle 120 of the golf equipment holder 100 is folded in a folded (or substantially vertical) position 250, in accordance with an embodiment of the invention.

Figure 3:
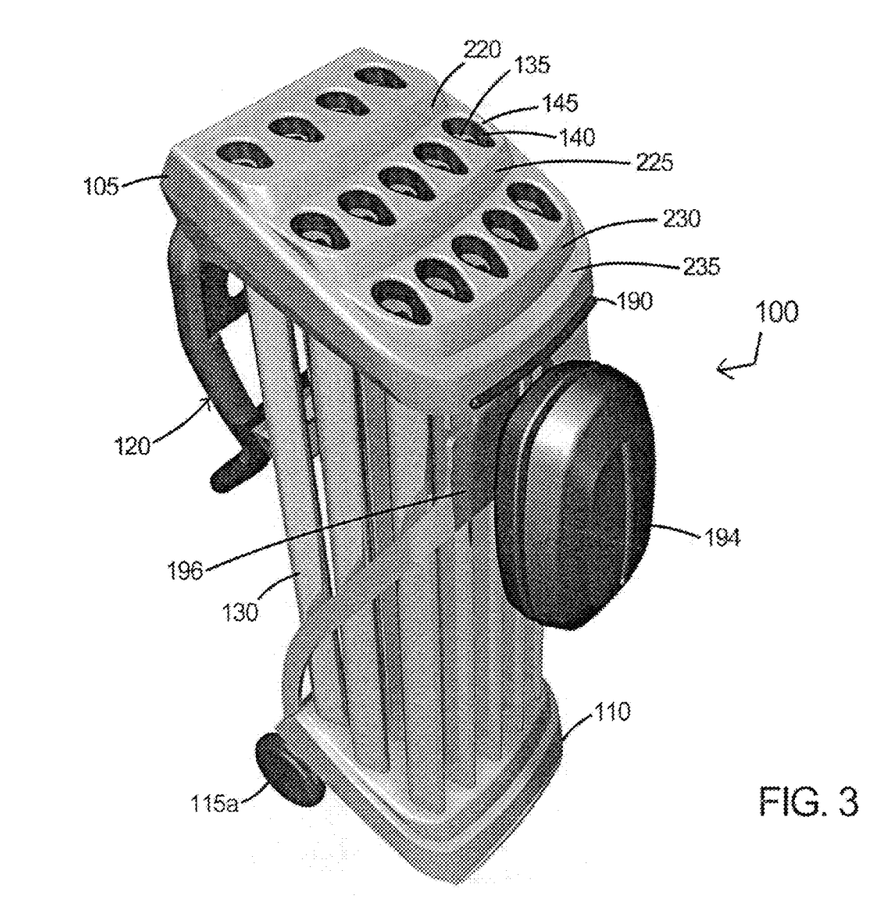
FIG. 3 is an illustration of a golf equipment holder in a side perspective view, wherein the handle of the golf equipment holder is folded, in accordance with an embodiment of the invention.

FIG. 3 is an illustration of a golf equipment holder 100 in a side perspective view, wherein the handle 120 of the golf equipment holder 100 is folded, in accordance with an embodiment of the invention. The stair-steps 220, 225, and 230 are each seen in different elevations or heights. A bumper 140 is shown as surrounding an aperture 135 and as coupled to an inner wall 145 around the aperture 135.

Figure 4:
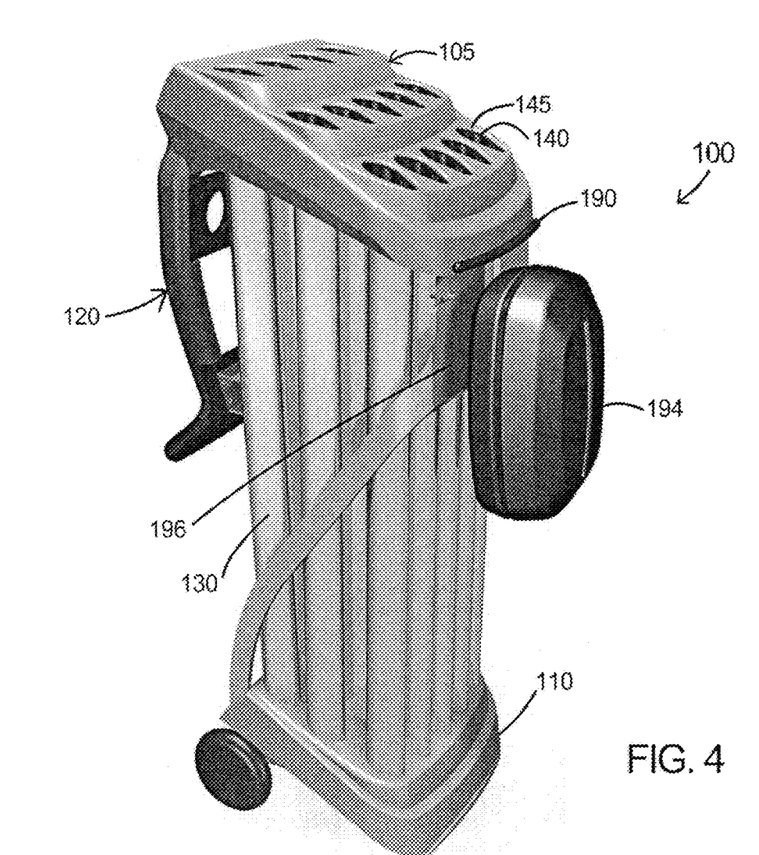
FIG. 4 is an illustration of a golf equipment holder in a side view, wherein the handle of the golf equipment holder is folded, in accordance with an embodiment of the invention.

FIG. 4 is an illustration of a golf equipment holder 100 in a side view, wherein the handle 120 of the golf equipment holder 100 is folded, in accordance with an embodiment of the invention.

Figure 5:
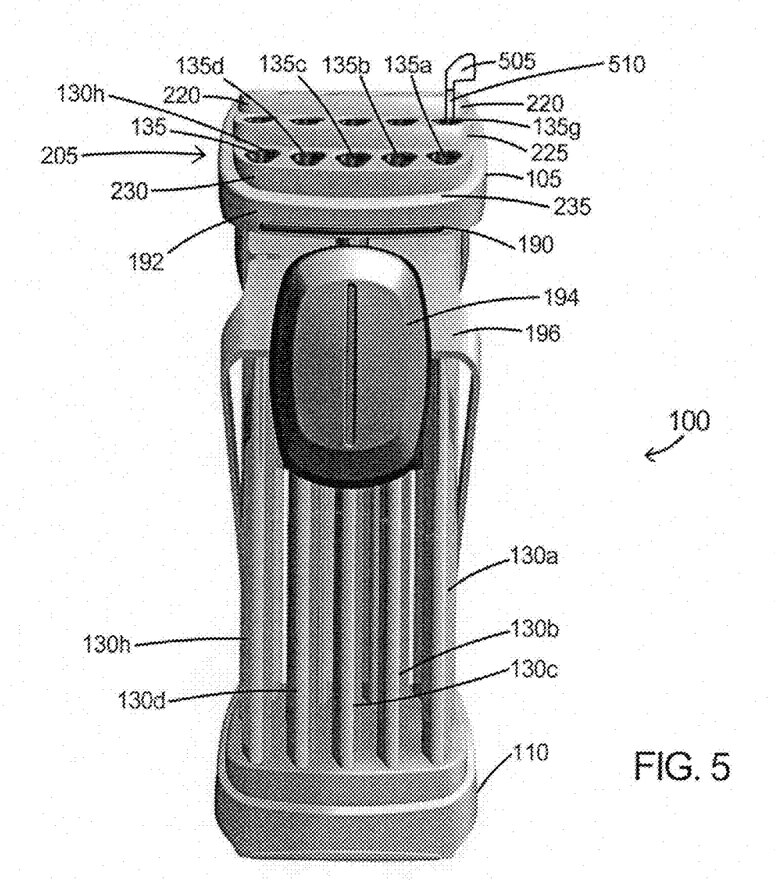
FIG. 5 is an illustration of a golf equipment holder in a rear elevational view, in accordance with an embodiment of the invention.

FIG. 5 is an illustration of a golf equipment holder in a rear elevational view, in accordance with an embodiment of the invention. The stair-steps 220, 225, and 230 are seen in different elevations or heights. The apertures 135a, 135b, 135c, 135d, and 135h (in row 205) are vertically aligned with the tubes 130a, 130b, 130c, 130d, and 130h, respectively. A golf club 505 is removably inserted and removably held in the aperture 135g.

In an embodiment of the invention, the handle 190 is slidable within a recess in the side surface 192 of the top component 105.

Figure 6:
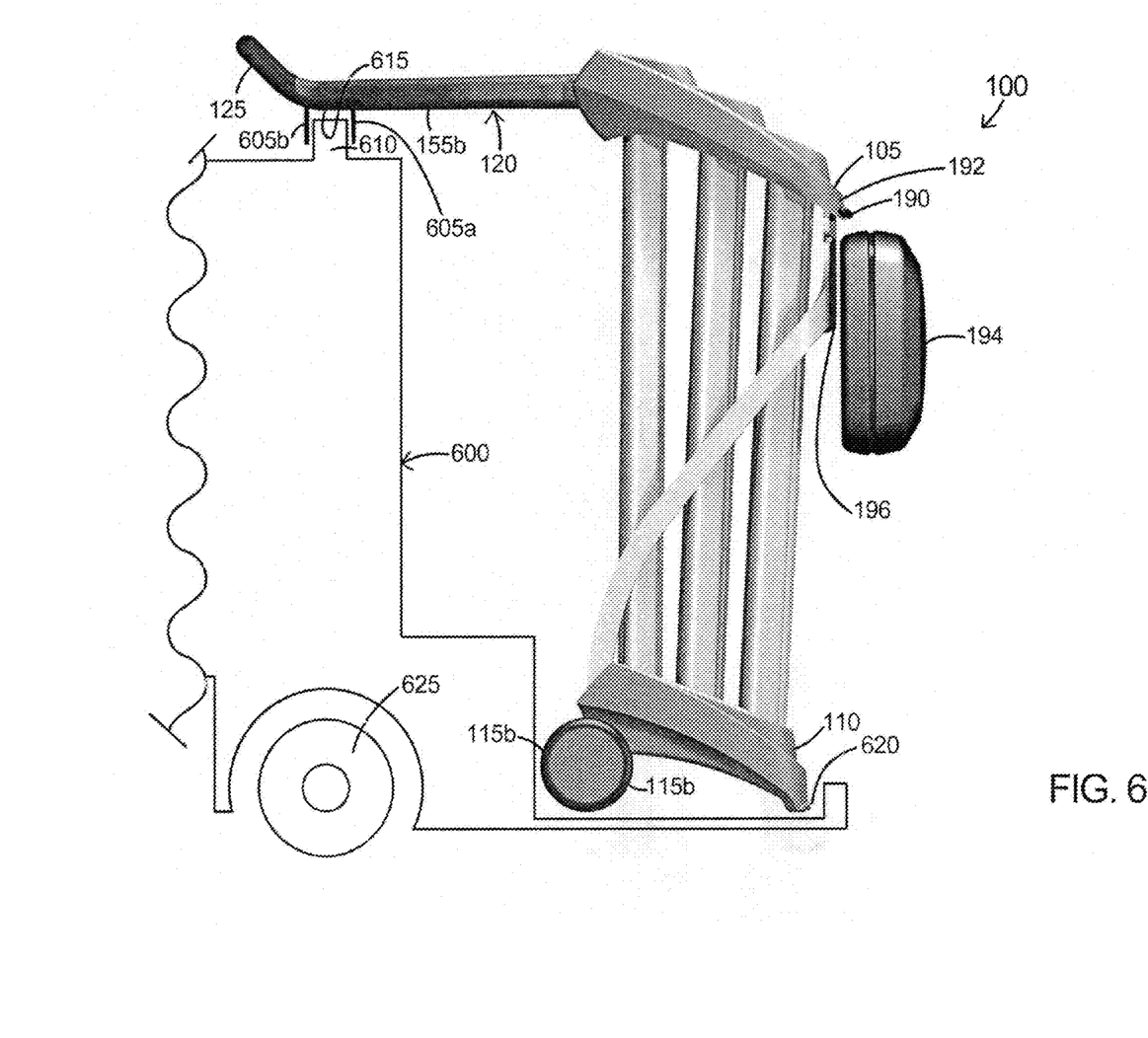
FIG. 6 is an illustration of a golf equipment holder in a side elevational view, wherein the handle of the golf equipment holder extended and wherein the golf equipment holder is removably secured in a golf cart, in accordance with an embodiment of the invention.

FIG. 6 is an illustration of a golf equipment holder 100 in a side elevational view, wherein the handle 120 of the golf equipment holder 100 is extended, in accordance with an embodiment of the invention. The golf equipment holder 100 is removably attached to a golf cart 600 by removably placing the attachment members 605a and 605b on or around a golf cart part 610. The attachment members 605a and 605b are coupled to the bottom surface 615 of the attachment component 150 (FIG. 1). Therefore, the golf cart part 610 is pressed against the attachment members 605a and 605b so that the golf equipment holder 100 is secured and does not move within the holding area 620 of the golf cart 600 wherein the holding area 620 is near a rear wheel 625 of the golf cart 600. The golf cart 600 can be any configuration, and the representative drawing of the golf cart 600 in FIG. 6 is not in any way a limitation on the embodiments of the invention.

Figure 7:
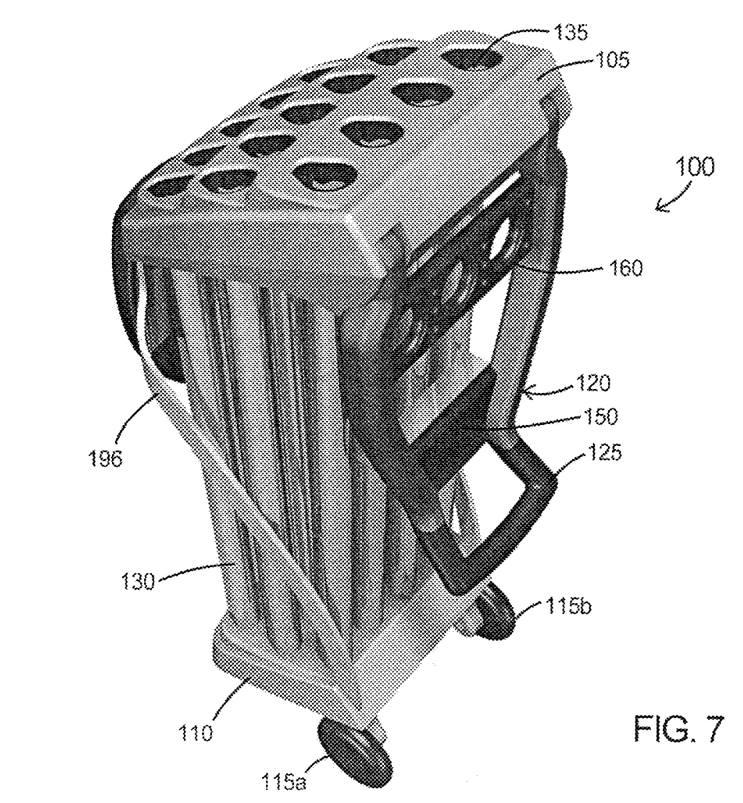
FIG. 7 is an illustration of a golf equipment holder in a side perspective view, wherein the handle of the golf equipment holder is folded, in accordance with an embodiment of the invention.

FIG. 7 is an illustration of a golf equipment holder 100 in a side perspective view, wherein the handle 120 of the golf equipment holder 100 is folded, in accordance with an embodiment of the invention. The wheels 115a and 115b are shown as attached to the bottom component 110.

Figure 8:
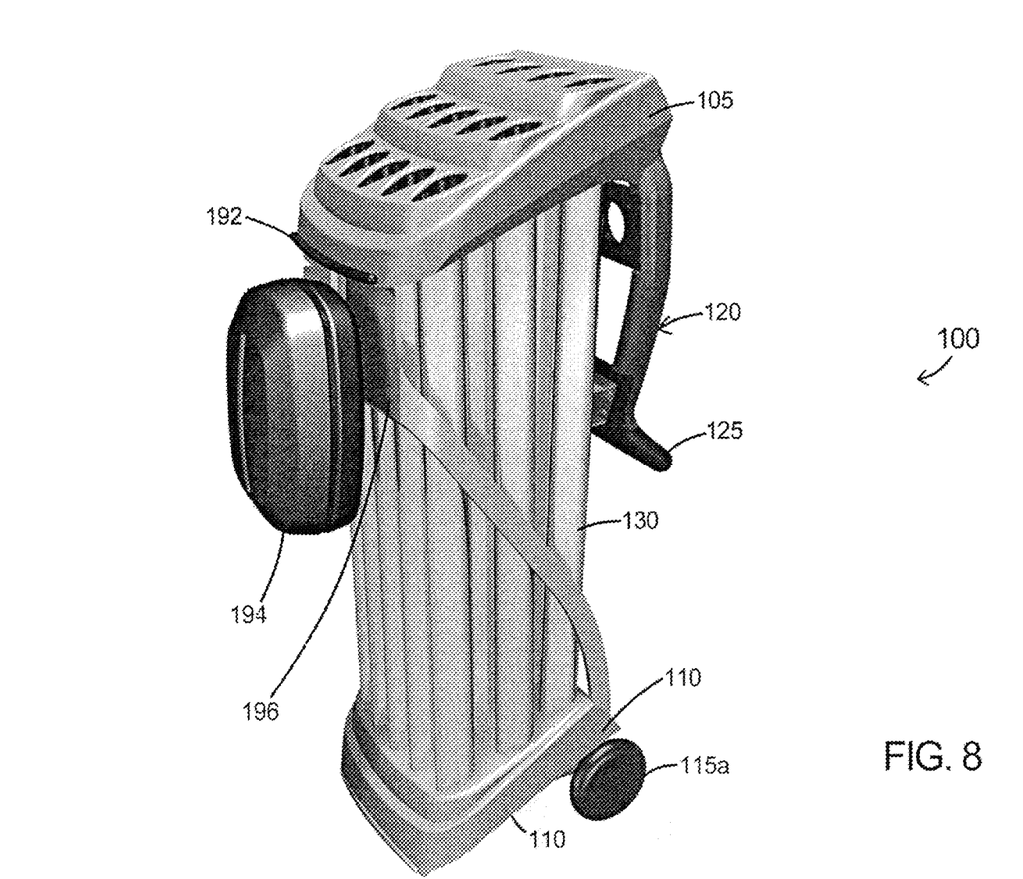
FIG. 8 is an illustration of a golf equipment holder in a side perspective view, wherein the handle of the golf equipment holder is folded, in accordance with an embodiment of the invention.

FIG. 8 is an illustration of a golf equipment holder 100 in a side perspective view, wherein the handle 120 of the golf equipment holder 100 is folded, in accordance with an embodiment of the invention.

Figure 9:
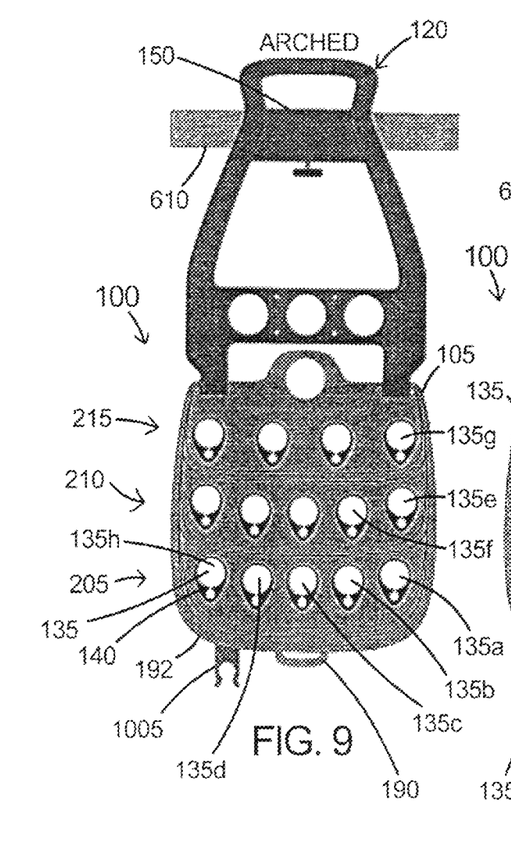
FIG. 9 is an illustration of a golf equipment holder in a top elevational view, in accordance with an embodiment of the invention.

FIG. 9 is an illustration of a golf equipment holder 100 in a top elevational view, in accordance with an embodiment of the invention. The apertures 135 are configured in an arched layout. For example, the apertures 135a-135d and 135h (in row 205) horizontally span (from a top elevational view) a width distance that is less than the width distance horizontally spanned by the apertures 135 in row 210 and less than the width distance horizontally spanned by the apertures 135 in row 215. Since the apertures 135 in row 205 are spanning a width distance that is less than the width distances spanned by other apertures 135 in the other rows, the apertures 135 form an arched layout.

Figure 10:
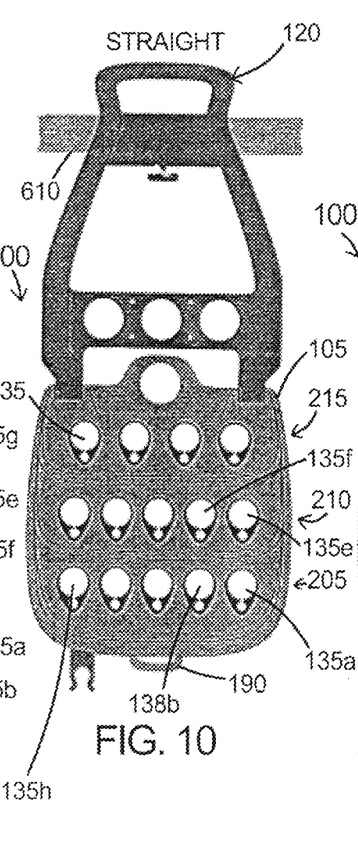
FIG. 10 is an illustration of a golf equipment holder in a top elevational view, in accordance with an embodiment of the invention.

FIG. 10 is an illustration of a golf equipment holder 100 in a top elevational view, in accordance with an embodiment of the invention. The apertures 135 are configured in a straight layout. For example, the apertures 135a-135d and 135h (in row 205) horizontally span (from a top elevational view) a width distance that is the same as the width distance horizontally spanned by the apertures 135 in row 210 and width distance horizontally spanned by the apertures 135 in row 215. Since the apertures 135 in row 205 are spanning a width distance that is the same than the width distances spanned by other apertures 135 in the other rows, the apertures 135 form a straight layout. As an example, a given aperture 135 in the row 205 are vertically parallel (as seen from a top elevational view) to a corresponding aperture 135 in the row 210. As an example, apertures 135a and 135b are vertically parallel to apertures 135e and 135f as seen from a top elevational view, respectively.

In an embodiment of the invention, the golf equipment holder 100 includes a putter holder 1005 that is coupled to the side surface 192.

Figure 11:
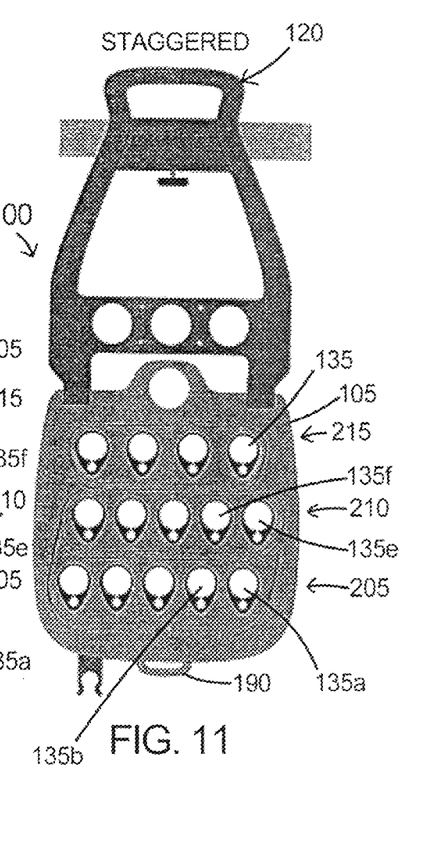
FIG. 11 is an illustration of a golf equipment holder in a top elevational view, in accordance with an embodiment of the invention.

FIG. 11 is an illustration of a golf equipment holder 100 in a top elevational view, in accordance with an embodiment of the invention. The apertures 135 are configured in a staggered layout. For example, the apertures 135a-135d and 135h (in row 205) horizontally span (from a top elevational view) a width distance that is the same as the width distance horizontally spanned by the apertures 135 in row 210 and width distance horizontally spanned by the apertures 135 in row 215. However, the apertures 135 in the row 205 are offset to the apertures in the row 210 (from a top elevational view). Since the apertures 135 in row 205 are spanning a width distance that is the same than the width distances spanned by other apertures 135 in the other rows but the apertures 135 in row 205 are offset from the apertures 135 in the other rows, the apertures 135 form a staggered layout. As an example, a given aperture 135 in the row 205 are not vertically parallel (from a top elevational view) to a corresponding aperture 135 in the row 210. As an example, apertures 135a and 135b are offset (from a top elevational view) from apertures 135e and 135f, respectively, so that the aperture 135a is not vertically parallel (as seen in a top elevational view) to the apertures 135e and 135f and the aperture 135b is not vertically parallel to the aperture 135f.

Figure 12:
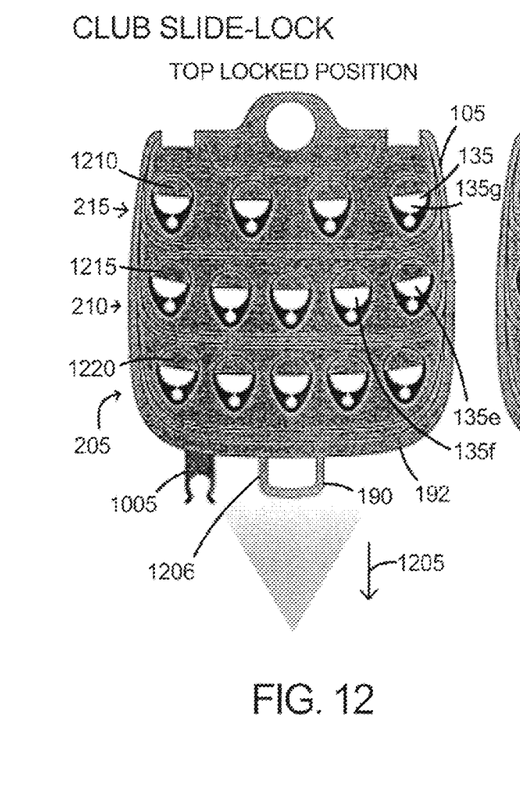
FIG. 12 is an illustration of a golf equipment holder in a top elevational view, in accordance with an embodiment of the invention.

FIG. 12 is an illustration of a golf equipment holder 100 in a top elevational view, in accordance with an embodiment of the invention. The lock activation handle 190 can vary in shape, such as, for example, the short square-like shape of the handle 190 in FIG. 12 or the elongated shape of the handle 190 in FIG. 5.

In an embodiment of the invention, the golf equipment holder 100 is placed in a top locked position by the user pulling the handle 190 in a direction 1205 away from the side surface 192. By pulling the handle 190 in the direction 1205, a club-slide lock mechanism 1206 is slid in the direction 1205 and a first elongated member 1210 (of the club-slide lock mechanism 1206) will partially cover the apertures 135 on the row 215. The mechanism 1206 will slide within a recess formed in the side surface 192 and within the top component 105. For example, the first elongated member 1210 covers the aperture 135g and all other apertures 135 on the row 215 in the top locked position. As an example, if the golf club 505 (FIG. 5) is inserted in the aperture 135g, then the first elongated member 1210 will be in contact with the shaft 510 (FIG. 5) of the golf club 505 so that the first elongated member 1210 will cover a portion of the aperture 135g. Since the first elongated member 1210 covers a portion of the aperture 135g in the top locked position, the golf club 505 is secured in the aperture 135g and a user or other person will not be able to pull the golf club 505 out of the aperture 135g since the first elongated member 1210 will block the vertical movement of a part of the golf club 505 and handle of the golf club 505 such that the golf club 505 is not completely removable from the aperture 135g. Therefore, the club slide-lock mechanism 1206 including the first elongated member 1210 provide a reliable security mechanism that prevents an authorized removal of golf clubs from the golf equipment holder 100.

Similarly, a second elongated member 1215 (of the club slide-lock mechanism 1206) covers the apertures 135e and 135f and all other apertures 135 on the row 210 in the top locked position.

Similarly, a third elongated member 1220 (of the club slide-lock mechanism 1206) covers the apertures 135a-135d and 135h on the row 205 in the top locked position.

Figures 13, 14:
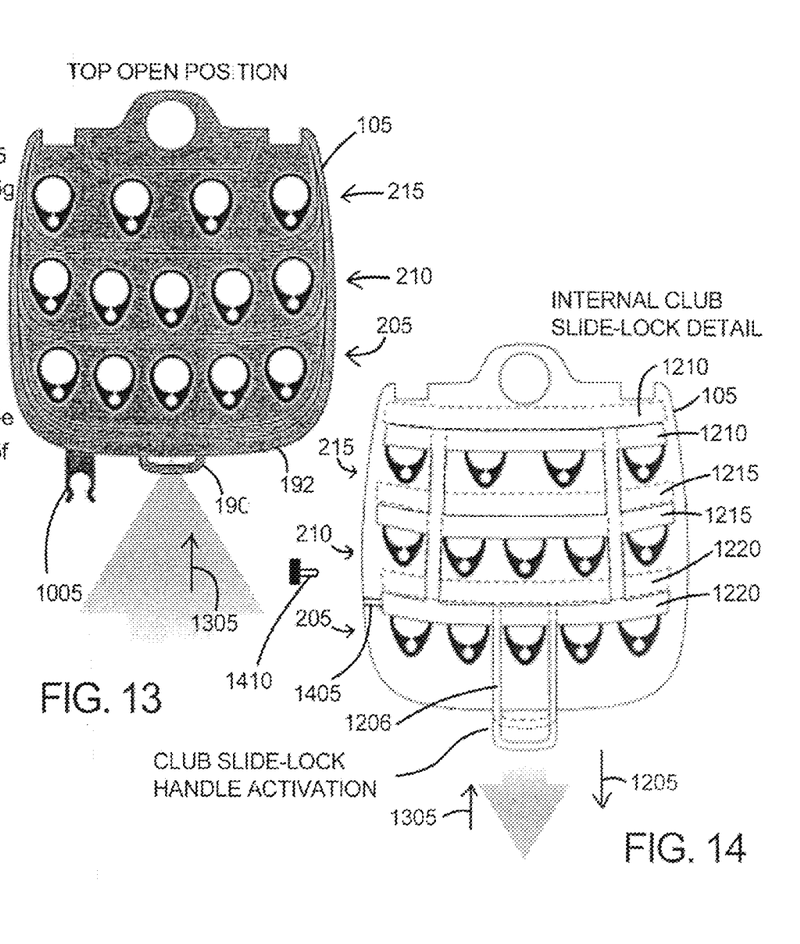
FIG. 13 is an illustration of a golf equipment holder in a top elevational view, in accordance with an embodiment of the invention.
FIG. 14 is an illustration of a golf equipment holder in a cross-section top elevational view, in accordance with an embodiment of the invention.

FIG. 13 is an illustration of a golf equipment holder 100 in a top elevational view, in accordance with an embodiment of the invention.

In an embodiment of the invention, the golf equipment holder 100 is placed in a top open position by the user pushing the handle 190 in a direction 1305 toward the side surface 192. By pushing the handle 190 in the direction 1305, the club slide-lock mechanism 1206 is slid in the direction 1305 and the first elongated member 1210 (of the club slide-lock mechanism 1206) will not cover the apertures 135 on the row 215. As noted above, the mechanism 1206 slides within a recess in the side surface 192 and top component 105. For example, the first elongated member 1210 does not cover the aperture 135g and does not cover all other apertures 135 on the row 215 in the top open position. As an example, if the golf club 505 (FIG. 5) is inserted in the aperture 135g, then the first elongated member 1210 will not be in contact with the shaft 510 of the golf club 505 since the first elongated member 1210 will not cover the aperture 135g. Since the first elongated member 1210 will not cover the aperture 135g in the top open position, the golf club 505 is not secured in the aperture 135g and a user will be able to pull the golf club 505 completely out of the aperture 135g since the first elongated member 1210 will not block the vertical movement of a part of the golf club 505 and handle of the golf club 505 such that the golf club 505 is completely removable from the aperture 135g. Therefore, the club slide-lock mechanism 1206 including the first elongated member 1210 provides a reliable security mechanism that permit the removal of golf clubs from the golf equipment holder 100 in the top open position.

Similarly, the second elongated member 1215 (of the club slide-lock mechanism 1206) does not cover the apertures 135e and 135f and does not cover all other apertures 135 on the row 210 in the top open position.

Similarly, the third elongated member 1220 (of the club slide-lock mechanism 1206) does not cover the apertures 135a-135d and 135h on the row 205 in the top open position.

FIG. 14 is an illustration of a golf equipment holder 100 in a cross-section elevational view, in accordance with an embodiment of the invention.

In an embodiment of the invention, the golf equipment holder 100 is placed in a top locked position by the user pulling the handle 190 in a direction 1205 away from the side surface 192. By pulling the handle 190 in the direction 1205, the club slide-lock mechanism 1206 is slid in the direction 1205 and the elongated members 1210, 1215, and 1220 will partially cover the apertures 135 as similarly discussed above in the top locked position. The position of the club slide-lock mechanism 1206 is shown in solid lines in the top locked position in FIG. 14.

By pushing the handle 190 in the direction 1305, the club slide-lock mechanism 1206 is slid in the direction 1305 and the elongated members 1210, 1215, and 1220 will not cover the apertures 135 as discussed above in the top open position. The position of the club slide-lock mechanism 1206 is shown in broken lines in the top open position in FIG. 14.

In an embodiment of the invention, the club slide-lock mechanism 1206 is securely locked in place in the top locked position by a suitable locking mechanism. For example, a lock 1405 can be locked and unlocked by a key 1410. When the lock 1405 is locked, the lock 1405 will secure the club slide-lock mechanism 1206 so that the club slide-lock mechanism will not move from the top locked position. When the lock 1405 is unlocked, the lock 1405 does not secure the club slide-lock mechanism 1206 so that the club slide-lock mechanism will move from the top locked position and can move in the top open position.

Figures 15, 16, 17, 18, 19:
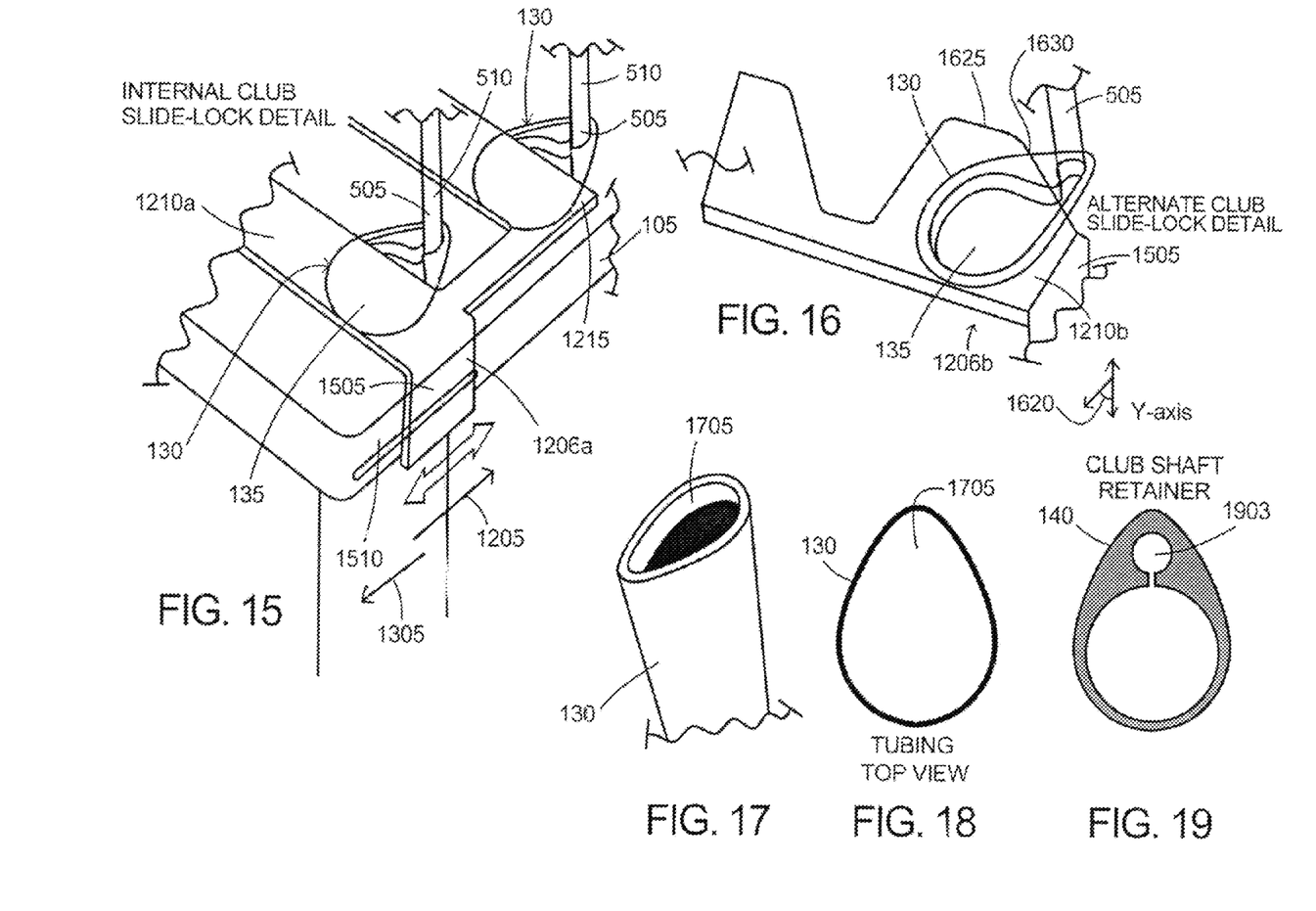
FIG. 15 is an illustration of a club slide-lock mechanism in a side perspective view, in accordance with another embodiment of the invention.
FIG. 16 is an illustration of a club slide-lock mechanism in a side perspective view, in accordance with another embodiment of the invention.
FIG. 17 is an illustration of a tube in a side perspective view, in accordance with another embodiment of the invention.
FIG. 18 is an illustration of a tube in a top elevational view, in accordance with another embodiment of the invention.
FIG. 19 is an illustration of a bumper (club shaft retainer) in a top elevational view, in accordance with another embodiment of the invention.

FIG. 15 is an illustration of a club slide-lock mechanism 1206a in a side perspective view, in accordance with another embodiment of the invention. The mechanism 1206a slides in the direction 1205 so that the mechanism 1206a is in the top locked position and slides in the direction 1305 so that the mechanism 1206a is in a top open position. In this embodiment of the club slide-lock mechanism, the mechanism 1206a includes a vertical side member 1505 that is coupled to the first elongated member 1210a and that extends vertically along the side surface 1510 of the top component 105. The tube 130 has a shape of a pear so that the shaft 510 of the golf club 505 falls forward (direction 1205) to be secured and locked in place within the aperture 135 when the mechanism 1206a is in the top locked position. In contrast, conventional tubes are normally round in shape. The oval shape or shape of a pear of the tube 130 plays a part in removably securing the golf clubs within the tubes 130.

FIG. 16 is an illustration of a club slide-lock mechanism 1206b in a side perspective view, in accordance with another embodiment of the invention. The mechanism 1206b slides in the direction 1205 so that the mechanism 1206b is in the top locked position and slides in the direction 1305 so that the mechanism 1206b is in a top open position. In this embodiment of the club slide-lock mechanism, the mechanism 1206b includes a vertical side member (similar to member 1505) that is coupled to the first elongated member 1210b and that extends vertically along the side surface 1510 of the top component 105. The tubes 130 and apertures 135 are angled at an angular value 1620 with respect to a vertical y-axis, and therefore, the first elongated member 1210b includes a horizontal edge 1625 and an angled (or beveled) edge 1630 that is connected to the horizontal edge 1625. The angled edge 1630 blocks (and secures and locks) in place the golf club 505 within the aperture 135 if the mechanism 1206b is in the top locked position.

FIG. 17 is an illustration of a tube 130 in a side perspective view, in accordance with another embodiment of the invention. Each of the tubes 130 in the golf equipment holder 100 comprises a pear shape hole 1705 within the tube 130.

FIG. 18 is an illustration of a tube 130 in a top elevational view, in accordance with another embodiment of the invention.

FIG. 19 is an illustration of a bumper (club shaft retainer) 149 in a top elevational view, in accordance with another embodiment of the invention. The shaft 510 of the golf club 505 removably fits into the smaller opening 1905.

Another embodiment of the invention provides a golf equipment holder for removable attachment to a golf cart and the golf equipment holder is also disclosed in commonly-owned U.S. Patent Application Publication No. 20120261447 by Timothy Bryant. The holder has a golf rack with an elongated top bracket having apertures disposed along its length and a plurality of small holes. The golf rack further includes an elongated bottom bracket having apertures disposed along its length. Down tubes are disposed between the top and bottom bracket apertures. The down tubes are configured to removably receive the shafts of golf clubs while the small holes are configured to removably receive golf tees. The down tubes include bumpers for protecting the golf clubs during transit and drain plugs for draining water. The golf equipment holder beneficially also includes a putter holder, a golf bag holder, and a golf shoe cleaner. The golf equipment holder pivot mounts on a golf cart to provide better access to the golf equipment. In this embodiment, the major difference between the racks is that the down tubes of the two racks are slightly offset. That is, when looking straight onto the racks from their front the first down tube of the front rack is to the left of the first down tube of the back rack. In an embodiment, beneficially the putter holder for the back rack is on one side of the golf equipment holder while the putter holder for the front rack is on the other side. Another useful feature of the golf equipment holder is the golf shoe brushes disposed between the bottom "L" shaped brackets. Those brushes enable golfers to clean the bottoms of their golf shoes. Additionally, a golf ball holder can be attached to one or both top "L" brackets, preferably in the middle space.

Another embodiment of the invention provides a golf equipment holder that removably attaches to a golf cart and that removably holds golf equipment so that the golf equipment is readily accessible and visible to golf players. This golf equipment holder is also disclosed in commonly-owned U.S. Patent Application Publication No. 20120261447 by Timothy Bryant. A golf equipment holder according to those principles includes an attachment for connecting to a golf cart. The golf equipment further includes a golf rack having a) an elongated top bracket with apertures disposed along its length along with a plurality of small holes, and b) an elongated bottom bracket having apertures disposed along its length. Down tubes are disposed between the top and bottom bracket apertures. The down tubes are configured to removably receive the shafts of golf clubs while the small holes are configured to removably receive inserts for holding golf tees. The down tubes beneficially include bumpers for protecting the golf clubs during transit and drain plugs for draining water. Beneficially, a bumper can be removed to allow a down tube to hold an umbrella or a ball retriever. The golf equipment holder beneficially also includes a putter holder, a golf bag holder, a golf ball holder, and a golf shoe cleaner. The golf equipment holder attachment beneficially includes a pivot mount to provide better access to the golf equipment.

Foregoing described embodiments of the invention are provided as illustrations and descriptions. They are not intended to limit the invention to precise form described.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
   a golf equipment holder comprising a top component and a bottom component;
   a plurality of tubes disposed between and coupled to the top component and bottom component, wherein at least one of the tubes is configured to removably hold a golf club;
   wherein the top component comprises a plurality of apertures, wherein each of the plurality of apertures is vertically aligned with a corresponding one of the plurality of tubes;
   a handle pivotally attached to the top component, wherein the handle comprises an attachment component for removable mounting to a golf cart;
   a club slide-lock mechanism configured to securely lock the golf club in the at least one of the tubes;
   wherein the handle comprises a grip portion, a first edge, a second edge, and an attachment component;
   wherein the attachment component is between and is coupled to the first edge and the second edge;
   wherein the attachment component comprises a bottom surface and a plurality of attachment members that are coupled to the bottom surface and that are removably placed on a golf cart part;
   wherein the handle further comprises a holder component that is between and that is coupled to the first edge and the second edge;
   wherein the attachment component is between the grip portion and the holder component;
   wherein the holder component is between the attachment component and the top component;
   wherein the holder component comprises a plurality of small holes that are configured to removably hold golf tees and a plurality of large holes which are configured to removably hold golf balls, wherein the large holes are each larger in circumference than a given circumference of one of the small holes;
   wherein the top component comprises a side surface and a recess formed in the side surface; and
   wherein the club slide-lock mechanism comprises a lock activation handle and wherein the club slide-lock mechanism slides within the recess formed in the side surface of the top component.

2. The apparatus of claim 1, wherein the golf club is removably inserted into at least one of the apertures.

3. The apparatus of claim 1, further comprising: a plurality of wheels coupled to the bottom component.

4. The apparatus of claim 1, wherein the plurality of apertures comprises an arched layout.

5. The apparatus of claim 1, wherein the plurality of apertures comprises a straight layout.

6. The apparatus of claim 1, wherein the plurality of apertures comprises a staggered layout.

7. The apparatus of claim 1, wherein the plurality of apertures are disposed in rows that are in a stair-steps configuration.

8. The apparatus of claim 1, further comprising; a cargo pouch that is removably coupled to the golf equipment holder.

9. The apparatus of claim 1, wherein each of the apertures comprises a corresponding bumper comprising a flexible material.

10. The apparatus of claim 1, wherein the handle comprises the holder component with the large holes and the small holes and is rotated in a horizontal position and a vertical position.

11. The apparatus of claim 1, wherein the club slide-lock mechanism comprises at least one elongated member that partially blocks at least some of the apertures in a top locked position.

12. The apparatus of claim 1, wherein the golf equipment holder comprises a putter holder that is coupled to the side surface of the top component.

13. The apparatus of claim 1, wherein the club slide-lock mechanism includes a lock for locking the club slide-lock mechanism in a top lock position.

14. The apparatus of claim 1, wherein at least one of the tubes comprises plastic, aluminum, or aluminum alloy.

15. The apparatus of claim 1, wherein each one of the tubes comprises a pear shaped opening.

* * * * *